(12) United States Patent
Sawada et al.

(10) Patent No.: US 12,415,584 B2
(45) Date of Patent: Sep. 16, 2025

(54) COVER STRUCTURE

(71) Applicant: SUZUKI MOTOR CORPORATION, Hamamatsu (JP)

(72) Inventors: Fujimi Sawada, Hamamatsu (JP); Tomoya Murakami, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 842 days.

(21) Appl. No.: 17/691,070

(22) Filed: Mar. 9, 2022

(65) Prior Publication Data

US 2022/0297782 A1    Sep. 22, 2022

(30) Foreign Application Priority Data

Mar. 22, 2021 (JP) .................... 2021-046856

(51) Int. Cl.
   - B62J 17/10 (2020.01)
   - B62J 23/00 (2006.01)

(52) U.S. Cl.
   CPC .............. *B62J 17/10* (2020.02); *B62J 23/00* (2013.01)

(58) Field of Classification Search
   CPC .................................. B62J 17/10; B62J 23/00
   USPC .................................................. 296/136.01
   See application file for complete search history.

(56) References Cited

U.S. PATENT DOCUMENTS

| | | | |
|---|---|---|---|
| 8,256,556 B2 * | 9/2012 | Inose ........................ | B62J 17/02 180/219 |
| 2006/0220407 A1 * | 10/2006 | Misaki ........................ | B62J 9/23 296/37.1 |
| 2022/0073166 A1 * | 3/2022 | Nakayama ............... | B62J 17/02 |

FOREIGN PATENT DOCUMENTS

| | | | | |
|---|---|---|---|---|
| EP | 2889209 A1 * | 7/2015 | ............. | B62J 17/02 |
| EP | 3222503 A1 * | 9/2017 | ............. | B62J 17/02 |
| JP | H1179032 A * | 3/1999 | | |
| JP | 2007-42605 A | 2/2007 | | |
| JP | 4425821 B2 * | 3/2010 | ............... | B62J 9/00 |
| JP | 4531613 B2 * | 8/2010 | ............... | B62J 17/02 |
| JP | 2010-228553 A | 10/2010 | | |
| JP | 5485087 B2 * | 5/2014 | ............. | B62J 17/02 |
| JP | 2014-196097 A | 10/2014 | | |
| JP | 6759313 B2 * | 9/2020 | ............. | B62J 17/00 |

OTHER PUBLICATIONS

Machine translation of JP 097 (Year: 2014).*
Notice of Reasons for Refusal dated Oct. 1, 2024, issued by the Japanese Patent Office in corresponding application JP 2021-046856.

* cited by examiner

*Primary Examiner* — Hilary L Gutman
(74) *Attorney, Agent, or Firm* — Stein IP, LLC (57) ABSTRACT

A cover structure of a vehicle front portion of a straddle-type vehicle provided with a headlamp unit is provided. The cover structure includes a lamp cover attached to a periphery of the headlamp unit, and a side cover disposed on a rear side of the lamp cover and outward in a left-right direction of the lamp cover. An outer side surface of the lamp cover is inclined outward in the left-right direction toward an outer side surface of the side cover.

6 Claims, 8 Drawing Sheets

FIG. 8

COVER STRUCTURE

CROSS-REFERENCE TO RELATED APPLICATIONS

The disclosure of Japanese Patent Application No. 2021-046856 filed on Mar. 22, 2021, including specification, drawings and claims is incorporated herein by reference in its entirety.

BACKGROUND

The present invention relates to a cover structure.

A lamp cover that covers a periphery of a headlamp unit is attached to a straddle-type vehicle (see, for example, Patent Literature 1). A mounting portion protrudes from an inner surface of the lamp cover disclosed in Patent Literature 1, and a bracket is attached to a mounting hole of the mounting portion via a bolt. A base plate is provided on a rear surface of the headlamp unit, and the bracket is attached to a mounting hole of the base plate via a bolt. By connecting the rear surface of the headlamp unit and the inner surface of the lamp cover via the bracket, an exposure of the bolt to an outside is prevented and an appearance is improved.

Patent Literature 1: JP-A-2007-42605

SUMMARY

According to an aspect of the invention, there is provided a cover structure of a vehicle front portion of a straddle-type vehicle provided with a headlamp unit, the cover structure including:
- a lamp cover attached to a periphery of the headlamp unit; and
- a side cover disposed on a rear side of the lamp cover and outward in a left-right direction of the lamp cover, wherein
- an outer side surface of the lamp cover is inclined outward in the left-right direction toward an outer side surface of the side cover.

DETAILED DESCRIPTION OF EXEMPLIFIED EMBODIMENTS

A left-right width of the lamp cover may be narrow in order to give an essential impression, but running wind passes through a side of the lamp cover and contact of the running wind with an occupant is strengthened. On the other hand, when the left-right width of the lamp cover is wide, there is a problem that the appearance is deteriorated without giving the essential impression.

The present invention is made in view of the points, and an object of the present invention is to provide a cover structure capable of reducing contact of running wind with an occupant without impairing an appearance.

A cover structure according to an aspect of the present invention is provided at a vehicle front portion of a straddle-type vehicle provided with a vehicle headlamp unit. In the cover structure, a lamp cover is attached to a periphery of the headlamp unit, and a side cover is disposed on a rear side of the lamp cover and outward in a left-right direction of the lamp cover. An outer side surface of the lamp cover is inclined outward in the left-right direction toward an outer side surface of the side cover, running wind from a front side is guided from the outer side surface of the lamp cover to the outer side surface of the side cover, and the running wind is diffused outward in the left-right direction on the outer side surface of the side cover in front of an occupant. Not only the outer side surface of the lamp cover, but also the outer side surface of the lamp cover and the outer side surface of the side cover direct flow of the running wind outward in the left-right direction, so that it is not necessary to form a large left-right width of the lamp cover for protection from wind. Therefore, it is possible to reduce contact of the running wind with the occupant without impairing an appearance.

EMBODIMENT

Figure 1:
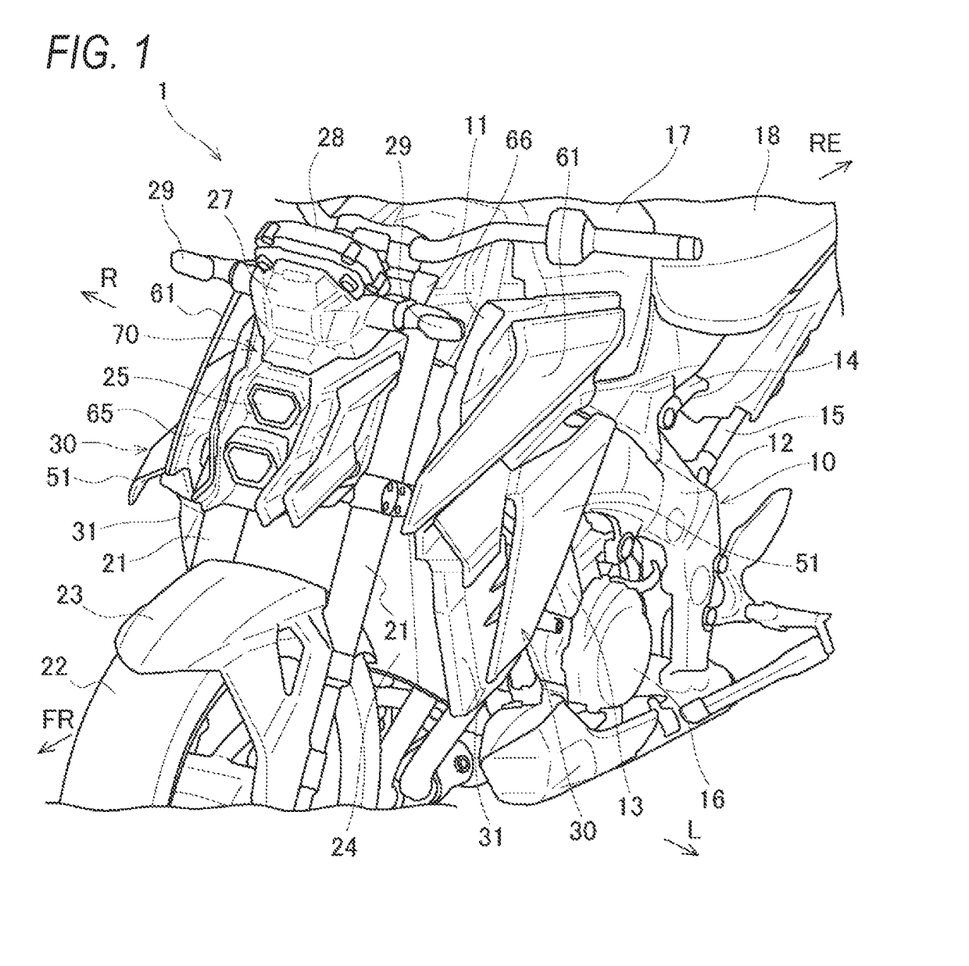
FIG. 1 is a perspective view of a vehicle front portion of a straddle-type vehicle according to a present embodiment.

Hereinafter, a straddle-type vehicle to which a cover structure according to a present embodiment is applied will be described with reference to the accompanying drawings. FIG. 1 is a perspective view of a vehicle front portion of the straddle-type vehicle according to the present embodiment. In the following drawings, an arrow FR indicates a vehicle front side, an arrow RE indicates a vehicle rear side, an arrow L indicates a vehicle left side, and an arrow R indicates a vehicle right side.

As shown in FIG. 1, a straddle-type vehicle 1 is configured by mounting various components such as an engine 16 and an electrical system on a twin spar type vehicle body frame 10 formed by aluminum casting. The vehicle body frame 10 includes a pair of main frames 12 that are branched off from a head pipe 11 to a left and right and extend rearward, and a pair of down frames 13 that are branched off from the head pipe 11 to the left and right and extend downward. A rear portion of the engine 16 is supported by the pair of main frames 12, and a front portion of the engine 16 is supported by the pair of down frames 13. By supporting the engine 16 with the vehicle body frame 10, rigidity of an entire vehicle is ensured.

A front side portion of the main frame 12 is a tank rail, and a fuel tank 17 is disposed on the tank rail. A rear side portion of the main frame 12 is a body frame, and a seat rail 14 and a back stay 15 extend rearward from an upper portion of the body frame. A rider seat 18 is disposed on the seat rail 14. A pair of front forks 21 are steerably supported by the head pipe 11 via a steering shaft (not shown). A front wheel 22 is rotatably supported at lower portions of the front fork 21, and an upper portion of the front wheel 22 is covered with a front fender 23.

A radiator 24 is disposed in front of a cylinder head of the engine 16 below the head pipe 11. The radiator 24 is provided with a radiator core having a large number of thin tubes or heat radiating fins. Heat exchange is performed between a refrigerant flowing through the radiator core and fuming wind blown onto the radiator core. A headlamp unit 25 is provided at a front portion of the straddle-type vehicle 1. A lamp cover 70 is attached to a periphery of the headlamp unit 25, and a pair of body covers (side covers) 30 that cover the radiator 24 from left and right sides are attached to a rear side of the lamp cover 70.

If the lamp cover 70 has a narrow left-right width, the vehicle front portion has an improved appearance, but the running wind easily flows from a side of the lamp cover 70 toward an occupant. Therefore, there is a demand for a cover structure that can reduce contact of the running wind with the occupant while preventing an increase in the left-right width of the lamp cover 70. In the cover structure of the present embodiment, an outer side surface of the lamp cover 70 having a narrow left-right width and an outer side surface of the body cover 30 disposed outward in a left-right direction of the lamp cover 70 diffuse flow of the running wind outward in the left-right direction, thereby reducing the contact of the running wind with the occupant without impairing an appearance.

Figure 2:
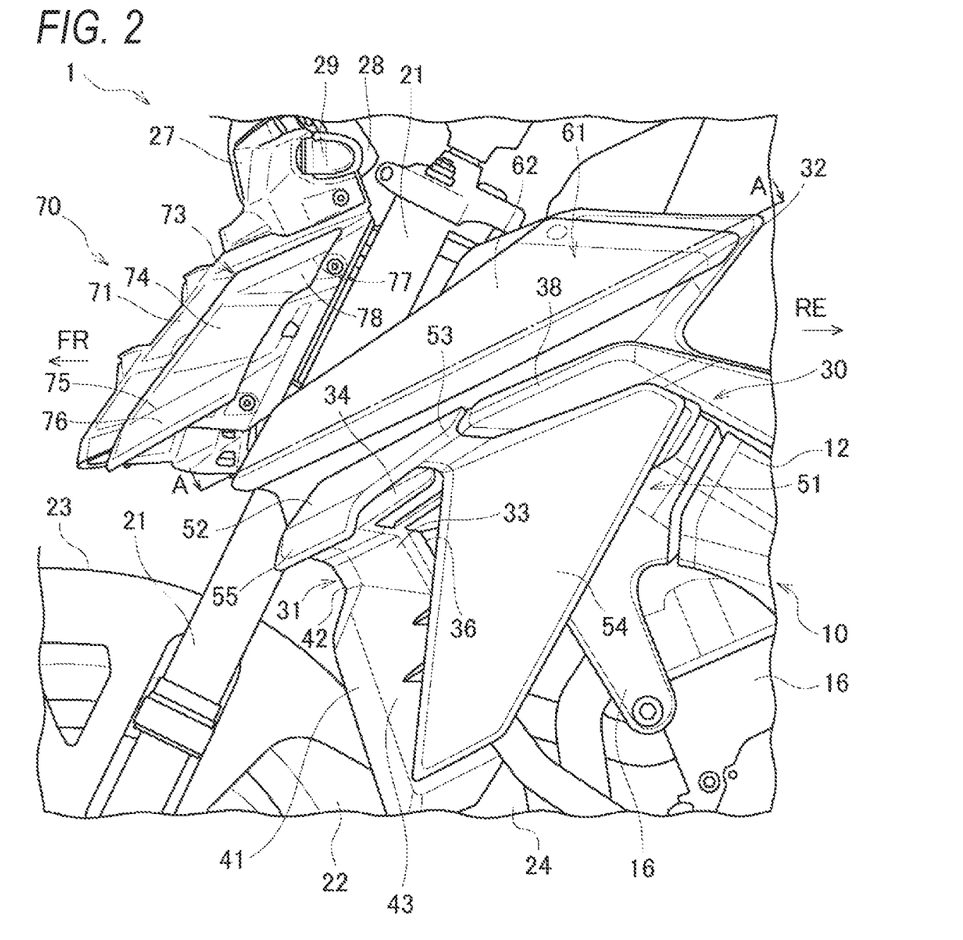
FIG. 2 is a left side view of the vehicle front portion according to the present embodiment.
Figure 3:
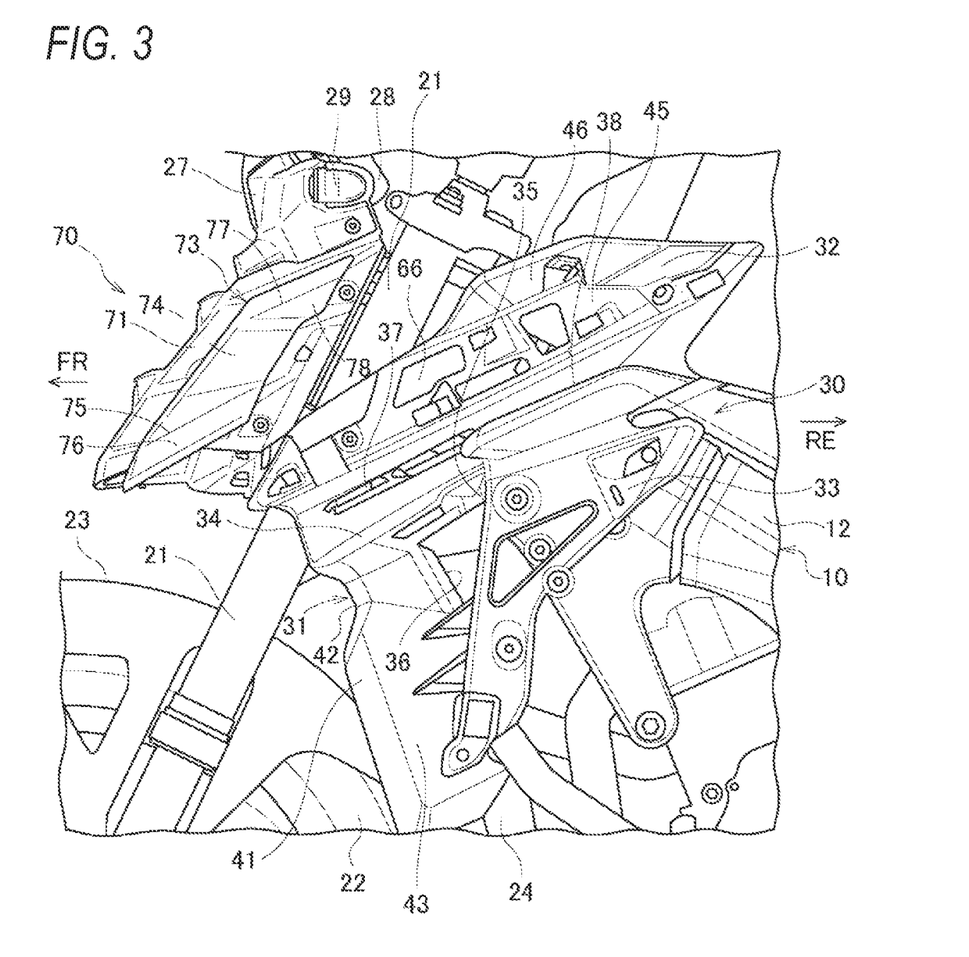
FIG. 3 is a left side view in which a part of a body cover is removed from the vehicle front portion according to the present embodiment.
Figure 4:
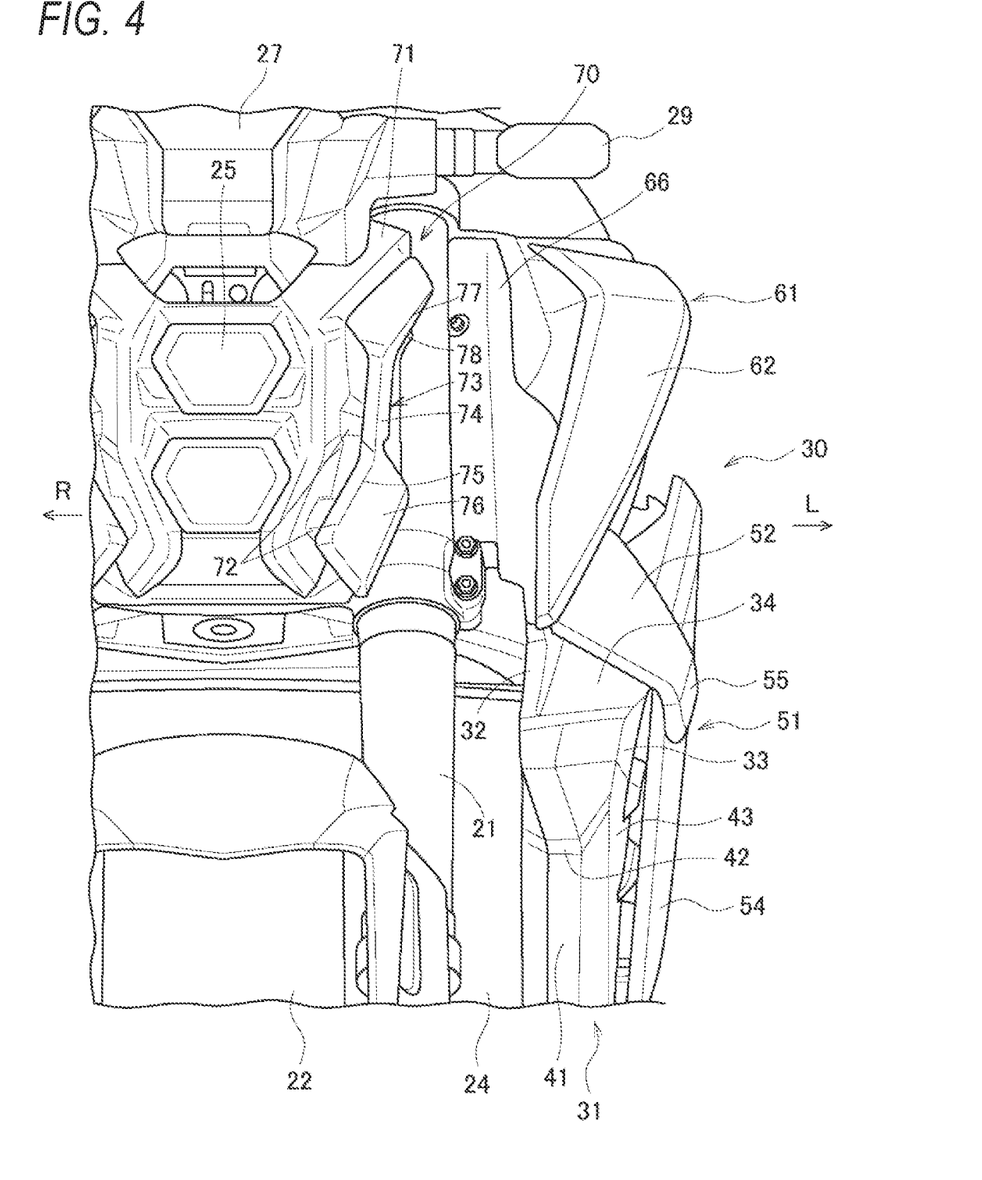
FIG. 4 is a front view of the vehicle front portion according to the present embodiment.

Hereinafter, a detailed configuration of the cover structure will be described with reference to FIGS. 2 to 4. FIG. 2 is a left side view of the vehicle front portion according to the present embodiment. FIG. 3 is a left side view in which a part of the body cover is removed from the vehicle front portion according to the present embodiment. FIG. 4 is a front view of the vehicle front portion according to the present embodiment.

As shown in FIGS. 2 to 4, the body cover 30 is disposed on the rear side the lamp cover 70 and outward in the left-right direction of the lamp cover 70, and forms an exterior of the vehicle front portion of the straddle-type vehicle 1 together with the lamp cover 70. The body cover 30 includes a base body cover 31 fixed to a front portion of the vehicle body frame 10, an upper body cover 61 and an outer body cover 51 outside the base body cover 31, and an inner body cover 66 inside the base body cover 31. The outer body cover 51 is disposed from a middle portion to a lower portion of an outer side surface of the base body cover 31, and the upper body cover 61 is disposed on an upper portion of the outer side surface of the base body cover 31.

The base body cover 31 covers the vehicle body frame 10 (main frame 12) from a side above the front wheel 22, and covers the radiator 24 from a side on a rear side of the front wheel 22. The base body cover 31 has an upper half portion 32 having a small left-right width and a lower half portion 33 having a large left-right width. A lower side with respect to an upper side of the outer side surface of the base body cover 31, that is, an outer side surface of the lower half portion 33 relative to an outer side surface of the upper half portion 32 protrudes outward in the left-right direction to form a stepped surface 34 (particularly see FIG. 4). The stepped surface 34 extends obliquely upward from a front edge toward a rear side of the base body cover 31, and the base body cover 31 is divided into the upper half portion 32 and the lower half portion 33 with the stepped surface 34 as a boundary.

A front edge of the stepped surface 34 is positioned above an upper end of the front wheel 22. An intermediate position of the stepped surface 34 in an extending direction is partially cut out to form a vertical groove 35. The vertical groove 35 extends toward an opening 36 of the lower half portion 33, which will be described later. The stepped surface 34 is divided into a front half portion and a rear half portion with the vertical groove 35 interposed therebetween, a long hole 37 is formed along the stepped surface 34 above the front half portion of the stepped surface 34, and a protruding portion 38 is formed along the stepped surface 34 above the rear half portion of the stepped surface 34. A plate-shaped portion 52 of the outer body cover 51, which will be described later, is attached to the long hole 37, and an upper surface of the protruding portion 38 is continuous with an upper surface of the plate-shaped portion 52.

The opening 36 having a triangular shape in a side view is formed below the stepped surface 34 and formed in the lower half portion 33 of the base body cover 31. The opening 36 connects an inside and an outside of the base body cover 31 on a side of the radiator 24 and in front of the main frame 12. The running wind is guided through the vertical groove 35 to the opening 36, and the running wind is taken into the inside of the base body cover 31. A front edge of the opening 36 is positioned inward in the left-right direction with respect to a rear edge of the opening 36, and a wall surface (not shown) having a large left-right width is formed on the rear edge of the opening 36. When the running wind from a front side contacts the wall surface on the rear edge of the opening 36, the running wind is taken into the inside of the base body cover 31 through the opening 36.

In a front view, an upper side of a lower side of the stepped surface 34 of the base body cover 31, that is, a front surface of the lower half portion 33 extends outward in the left-right direction from a front surface of the upper half portion 32 to form a lower front surface 41. The lower front surface 41 is formed by a front surface portion facing a front and an inclined surface portion facing obliquely forward. The lower front surface 41 is recessed below the stepped surface 34, and the lower front surface 41 protrudes forward from a recess 42 toward the front edge of the stepped surface 34 (particularly see FIG. 3). Since an inclination from the lower front surface 41 toward the stepped surface 34 is steep, even when the running wind is blown onto muddy water received by the lower front surface 41, the muddy water is less likely to get over the front edge of the stepped surface 34 upward.

In addition, a lower outer side surface 43 on the lower side of the stepped surface 34 of the base body cover 31 protrudes outward in the left-right direction toward a side edge of the stepped surface 34 (particularly see FIG. 4). Even when the running wind is blown onto the muddy water adhering to the lower outer side surface 43, the muddy water is less likely to get over the side edge of the stepped surface 34 upward. In a front side portion of the base body cover 31, the front edge and the side edge of the stepped surface 34 protrude outward, so that the muddy water is less likely to flow upward than the stepped surface 34, and adhesion of the muddy water to the occupant is prevented. In the side view, the lower half portion 33 of the base body cover 31 partially overlaps a rear portion of the front wheel 22. A shielding plate 44 (see FIG. 8) protrudes from an inner surface of the lower half portion 33 toward the main frame 12.

The outer side surface of the upper half portion 32 bulges outward in the left-right direction to form a bulging portion 45 above the long hole 37 and the protruding portion 38 of the base body cover 31. The bulging portion 45 extends obliquely upward from the front edge toward the rear side of the base body cover 31, and a plurality of openings are formed in the bulging portion 45. On an upper edge of the upper half portion 32, the outer side surface of the upper half portion 32 is recessed inward in the left-right direction to form a lateral groove 46 along the bulging portion 45. The upper body cover 61 is attached to an outer side surface of the bulging portion 45. The upper body cover 61 diffuses the running wind outward in the left-right direction on the rear side of the lamp cover 70.

The upper body cover 61 extends obliquely upward from the front edge toward the rear side of the base body cover 31. An upper end of the upper body cover 61 is positioned above an upper end of an outer lamp cover 73 to be described later, and a lower end of the upper body cover 61 is positioned below a lower end of the outer lamp cover 73. An inclined surface 62 inclined outward in the left-right direction from a front side toward a rear side and inclined inward in the left-right direction from an upper side toward a lower side is formed on an outer side surface of the upper body cover 61 (particularly see FIG. 4). The running wind flows obliquely downward toward the rear side along the inclined surface 62, and the running wind is less likely to flow toward the occupant.

The outer body cover 51 is attached to the outside of the base body cover 31 below the upper body cover 61. The outer body cover 51 is provided with the eaves-shaped plate-shaped portion 52 that covers the stepped surface 34 of the base body cover 31 from above, and a rear cover portion 54 that is connected to a rear side of the plate-shaped portion 52 via a connecting portion 53. The plate-shaped portion 52 is attached to the long hole 37 of the base body cover 31, and the plate-shaped portion 52 extends in a front-rear direction above the stepped surface 34. A front edge of the eaves-shaped plate-shaped portion 52 is positioned in front of the front edge of the stepped surface 34, and the muddy water splashed up by the front wheel 22 is received in a wide range by the plate-shaped portion 52.

The plate-shaped portion 52 is inclined downward outward in the left-right direction from the outer side surface of the base body cover 31, and a return portion 55 bent downward is formed on a side edge outward in the left-right direction of the plate-shaped portion 52. A gap exists between an inner surface of the return portion 55 and the side edge outward in the left-right direction of the stepped surface 34, and the return portion 55 extends to a position lower than the side edge of the stepped surface 34 (particularly see FIG. 4). The muddy water received by the plate-shaped portion 52 easily flows down from the return portion 55 to a position below the stepped surface 34, and the muddy water is less likely to flow upward than the plate-shaped portion 52, and the adhesion of the muddy water to the occupant is prevented. Although the return portion 55 is formed in a front half portion of the plate-shaped portion 52, the return portion 55 may be formed entirely along a longitudinal direction of the plate-shaped portion 52.

A passage of the running wind is formed by the stepped surface 34 and the eaves-shaped plate-shaped portion 52. The front edge of the stepped surface 34 and the front edge of the plate-shaped portion 52 form an entrance for the running wind, and the running wind from the front side enters the entrance of the running wind. The gap is formed between the inner surface of the return portion 55 and the stepped surface 34 as described above, and the running wind enters the gap. The running wind is rectified inside the plate-shaped portion 52, and a running resistance due to the running wind is reduced. Thus, the stepped surface 34 and the plate-shaped portion 52 not only receive the muddy water splashed up from the front wheel 22 but also form the passage of the running wind on the body cover 30 which can reduce the running resistance.

A rear portion of the plate-shaped portion 52 is positioned above the vertical groove 35, and the connection portion 53 is provided in the rear portion of the plate-shaped portion 52. The miming wind passing through an inside of the plate-shaped portion 52 is guided to the vertical groove 35 by an inner wall surface (not shown) of the connecting portion 53. The rear cover portion 54 is provided at a lower portion of the connecting portion 53. The rear cover portion 54 extends in the front-rear direction and in an upper-lower direction and covers the outside of the base body cover 31. Since a part of the rear cover portion 54 overlaps the vertical groove 35 and the opening 36 in the side view, the running wind is guided from the vertical groove 35 to the opening 36, and the running wind is efficiently taken into the inside of the base body cover 31.

The inner body cover 66 is attached to the inside of the base body cover 31 along the front edge of the base body cover 31. A lower portion of inner body cover 66 is formed along lower front surface 41 of base body cover 31. The lower portion of the inner body cover 66 is an inclined surface facing obliquely forward, and receives water droplets from the front side together with the lower front surface 41 of the base body cover 31. The base body cover 31, the inner body cover 66, the outer body cover 51, and the upper body cover 61 are fixed to each other mainly by hooking.

The lamp cover 70 includes a base lamp cover 71 that covers the periphery of the headlamp unit 25, and the outer lamp cover 73 that is attached to an outer side surface of the base lamp cover 71. The base lamp cover 71 exposes two upper and lower light-emitting bodies of the headlamp unit 25 from a front surface. The outer side surface of the base lamp cover 71 is inclined outward in the left-right direction toward the rear side, and the outer lamp cover 73 is attached to a convex portion 72 protruding from the outer side surface of the base lamp cover 71. Therefore, a gap is formed between the outer side surface of the base lamp cover 71 and an inner side surface of the outer lamp cover 73.

The outer lamp cover 73 is formed in a substantially parallelogram shape in the side view. A front edge and a rear edge of the outer lamp cover 73 are inclined rearward from a lower edge toward an upper edge, and the upper edge and the lower edge of the outer lamp cover 73 are inclined upward from the front edge toward the rear edge. A first guide surface 74 is formed in a middle in a height direction of an outer side surface of the outer lamp cover 73. The first guide surface 74 extends substantially horizontally from the front edge to the rear edge, and is inclined outward in the left-right direction from the front edge toward the rear edge. Since the running wind flows along the first guide surface 74, the running wind is guided rearward by the first guide surface 74.

On a lower side of the outer side surface of the outer lamp cover 73, a valley-shaped bent portion 75 is formed along the lower edge of the outer lamp cover 73. A valley line of the valley-shaped bent portion 75 extends parallel to the lower edge of the outer lamp cover 73, and a second guide surface 76 is formed below the valley line of the valley-shaped bent portion 75. The second guide surface 76 extends obliquely upward from the front edge toward the rear edge. The second guide surface 76 is inclined outward in the left-right direction from the valley line toward a lower edge, and is inclined outward in the left-right direction from the front edge toward the rear edge. Since the running wind flows along the second guide surface 76, the running wind is guided obliquely upward toward the rear side by the second guide surface 76.

On an upper side of the outer side surface of the outer lamp cover 73, a mountain-shaped bent portion 77 is formed along the upper edge of the outer lamp cover 73. A ridge line of the mountain-shaped bent portion 77 extends parallel to the upper edge of the outer lamp cover 73, and a third guide surface 78 is formed below the ridge line of the mountain-shaped bent portion 77. The third guide surface 78 is formed in a substantially triangular shape in the side view, is inclined inward in the left-right direction from the ridge line toward the lower side, and is inclined outward in the left-right direction from a front edge toward a rear edge. Since the running wind flows along the third guide surface 78, the running wind is guided rearward while upward diffusion of the running wind is prevented by the third guide surface 78.

Thus, the first to third guide surfaces 74, 76, and 78 of the outer lamp cover 73 are inclined outward in the left-right direction toward the rear side. Since the upper body cover 61 is disposed on a rear side of the outer lamp cover 73 and outward in the left-right direction of the outer lamp cover 73, the running wind is guided from the outer lamp cover 73 to the upper body cover 61. Although the front fork 21 is positioned on the rear side of the outer lamp cover 73, the running wind passes through a side of the front fork 21 and is guided to the upper body cover 61. The running wind is diffused outward in the left-right direction by the upper body cover 61, and the contact of the running wind with the occupant is reduced.

Also in the outer lamp cover 73, the running wind flowing along the first guide surface 74 merges with the running wind flowing along the second guide surface 76, so that the running wind is diffused and the contact of the running wind with the occupant is reduced. In addition, the running wind is less likely to diffuse upward by the third guide surface 78, and the flow of the running wind from the lamp cover 70 toward the occupant is prevented. Details of the flow of the running wind will be described later. A meter panel 27 is provided at an upper portion of the lamp cover 70, and a meter 28 is attached to a rear surface of the meter panel 27. A turn signal lamp 29 is provided on a side surface of the meter panel 27.

Figure 5:
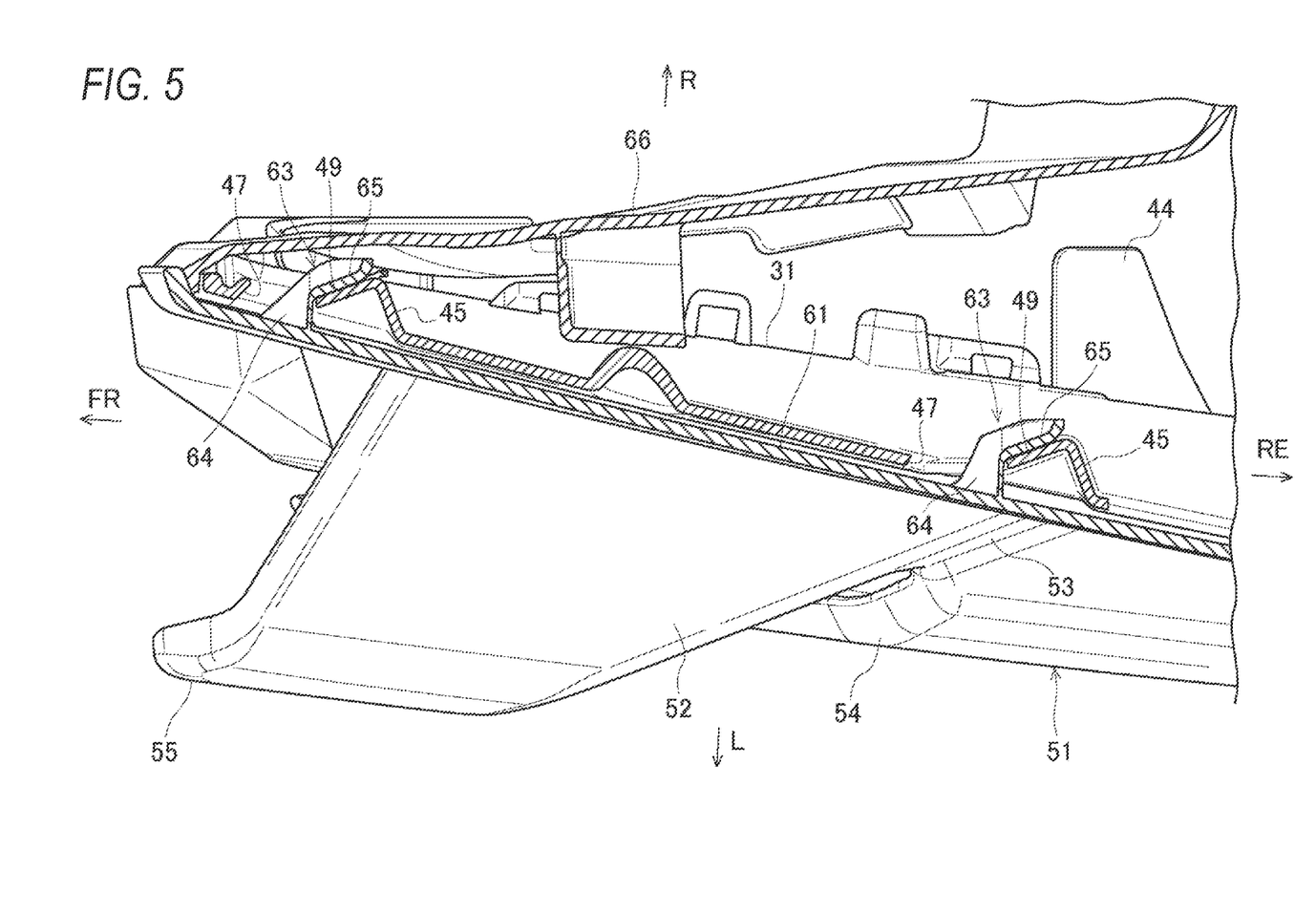
FIG. 5 is a cross-sectional view of the body cover taken along a line A-A of FIG. 2.
Figure 6:
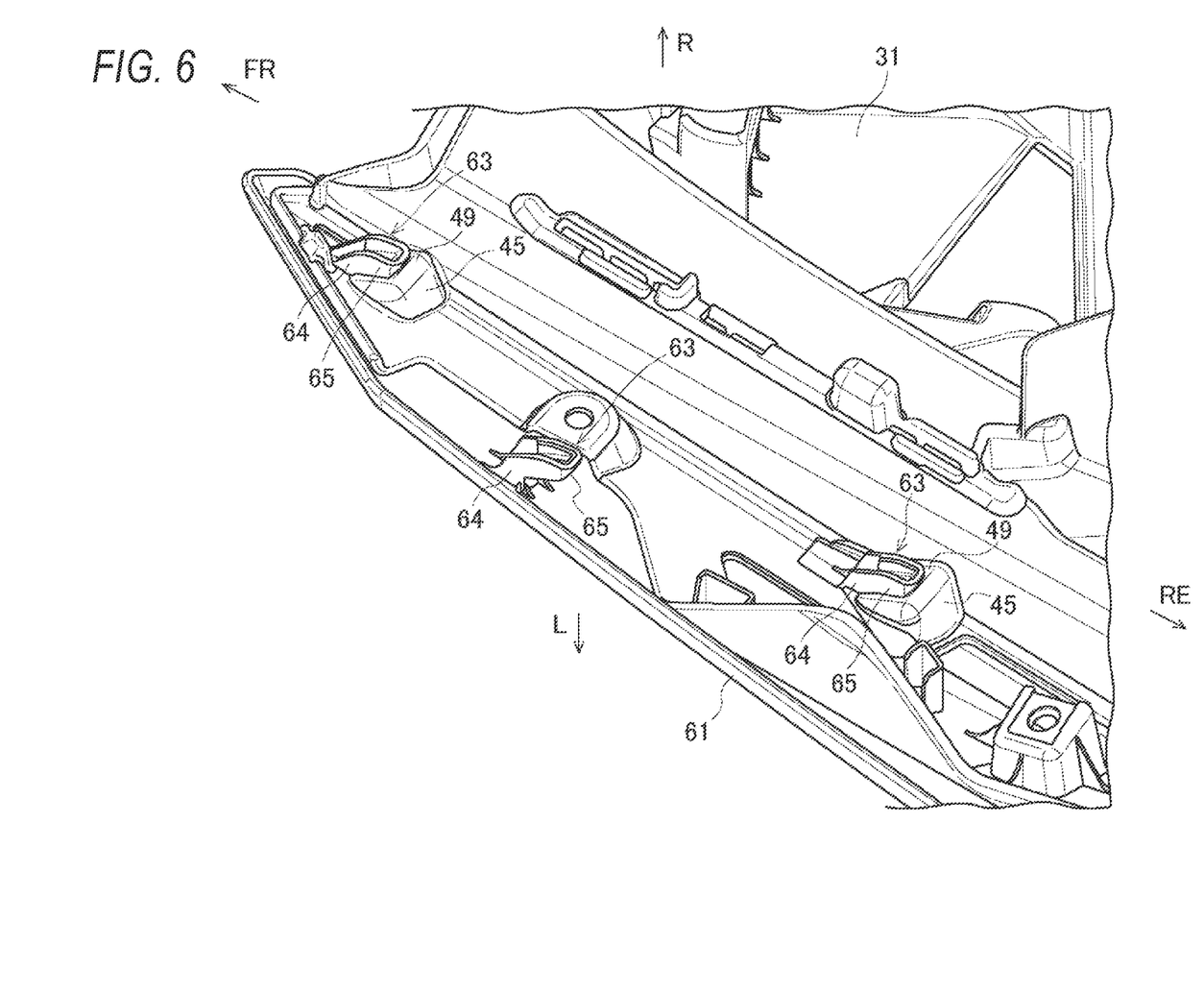
FIG. 6 is a perspective view showing a mounting portion of an upper body cover according to the present embodiment.

A mounting configuration of the upper body cover will be described with reference to FIGS. 5 and 6. FIG. 5 is a cross-sectional view of the body cover taken along a line A-A of FIG. 2. FIG. 6 is a perspective view showing a mounting portion of the upper body cover according to the present embodiment.

As shown in FIGS. 5 and 6, a plurality of hooks 63 are formed on the upper body cover 61. A hook 63 includes a base end portion 64 protruding from an inner side surface of the upper body cover 61, and a claw portion 65 extending rearward from a tip end portion of the base end portion 64. An interval between the claw portion 65 and the inner side surface of the upper body cover 61 increases from a base end of the claw portion 65 toward a tip of a claw. The base body cover 31 is formed with a plurality of hook holes 47 and a plurality of bulging portions 45 corresponding to the plurality of hooks 63. A support surface 49 on which the claw portion 65 is hooked is formed on the bulging portion 45, and an interval between the support surface 49 and the inner side surface of the base body cover 31 is widened from a front side to a rear side of the support surface 49.

The hook 63 of the upper body cover 61 enters the hook hole 47 of the base body cover 31, the claw portion 65 of the hook 63 is supported by the support surface 49 on the bulging portion 45, and the upper body cover 61 is hooked to the base body cover 31. At this time, since the claw portion 65 and the support surface 49 are inclined inward in the left-right direction toward the rear side, the support surface 49 easily enters an inside of the claw portion 65, and rattling is reduced inside the claw portion 65 when the claw portion 65 is inserted. It is preferable that an interval between the claw portion 65 and the inner side surface of the upper body cover 61 is equal to or smaller than an interval between the support surface 49 and the inner side surface of the base body cover 31.

A rear side of the upper body cover 61 is formed in a screwing structure or a clip fixing structure, and the upper body cover 61 is formed in a hooking structure described above except the rear side of the upper body cover 61. Since the hook 63 is formed in a hook shape, a left-right width of the upper body cover 61 required for the hooking structure is smaller than that of the screwing structure or the clip fixing structure. Since a left-right width on a front end side of the upper body cover 61 is narrow, the running wind is smoothly flowed toward a rear side of the upper body cover 61. The upper body cover 61 and the inner body cover 66 are also attached to each other by a similar hooking structure.

Figure 7:
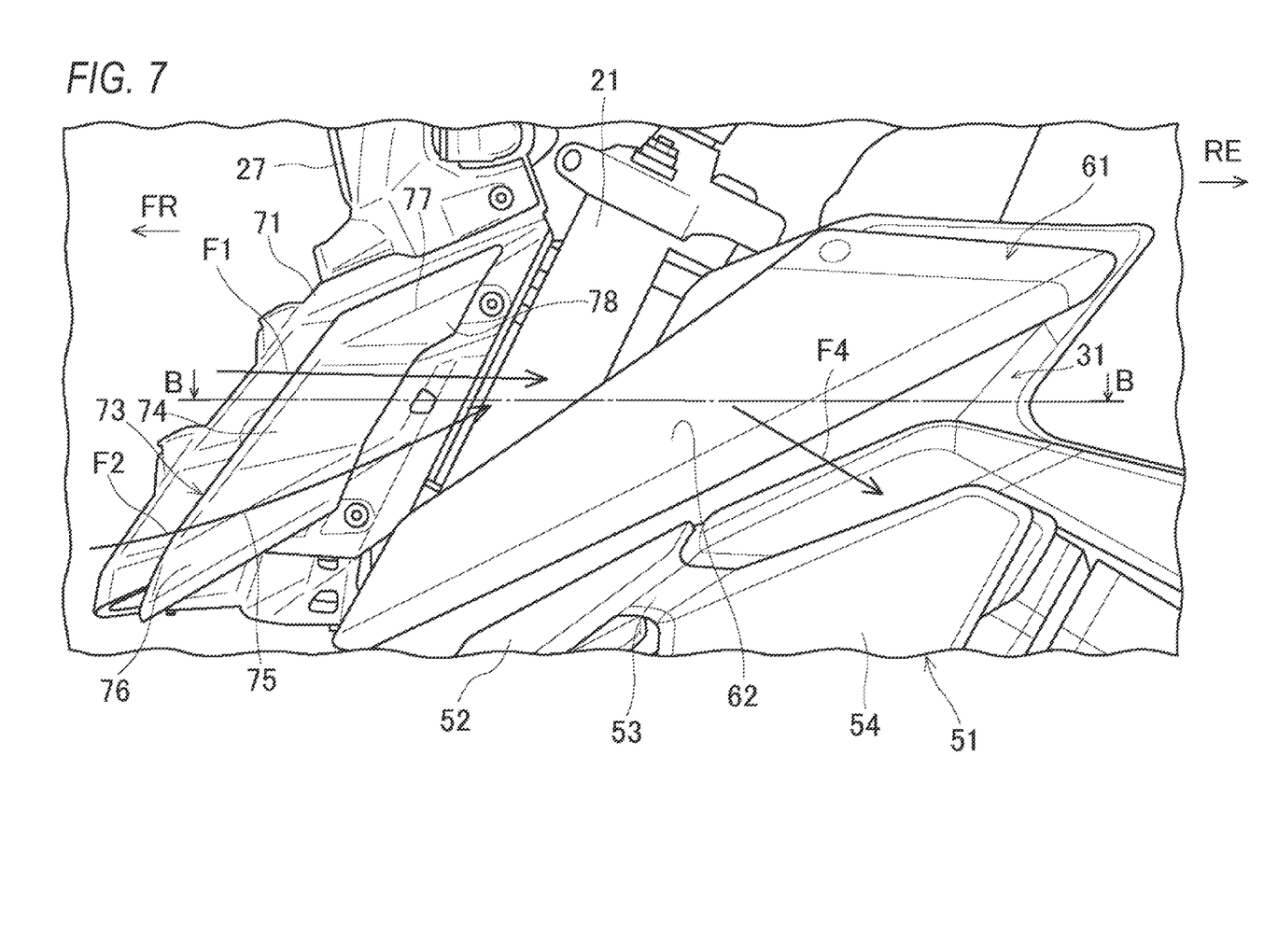
FIG. 7 is an enlarged view of a left side of the vehicle front portion according to the present embodiment.
Figure 8:
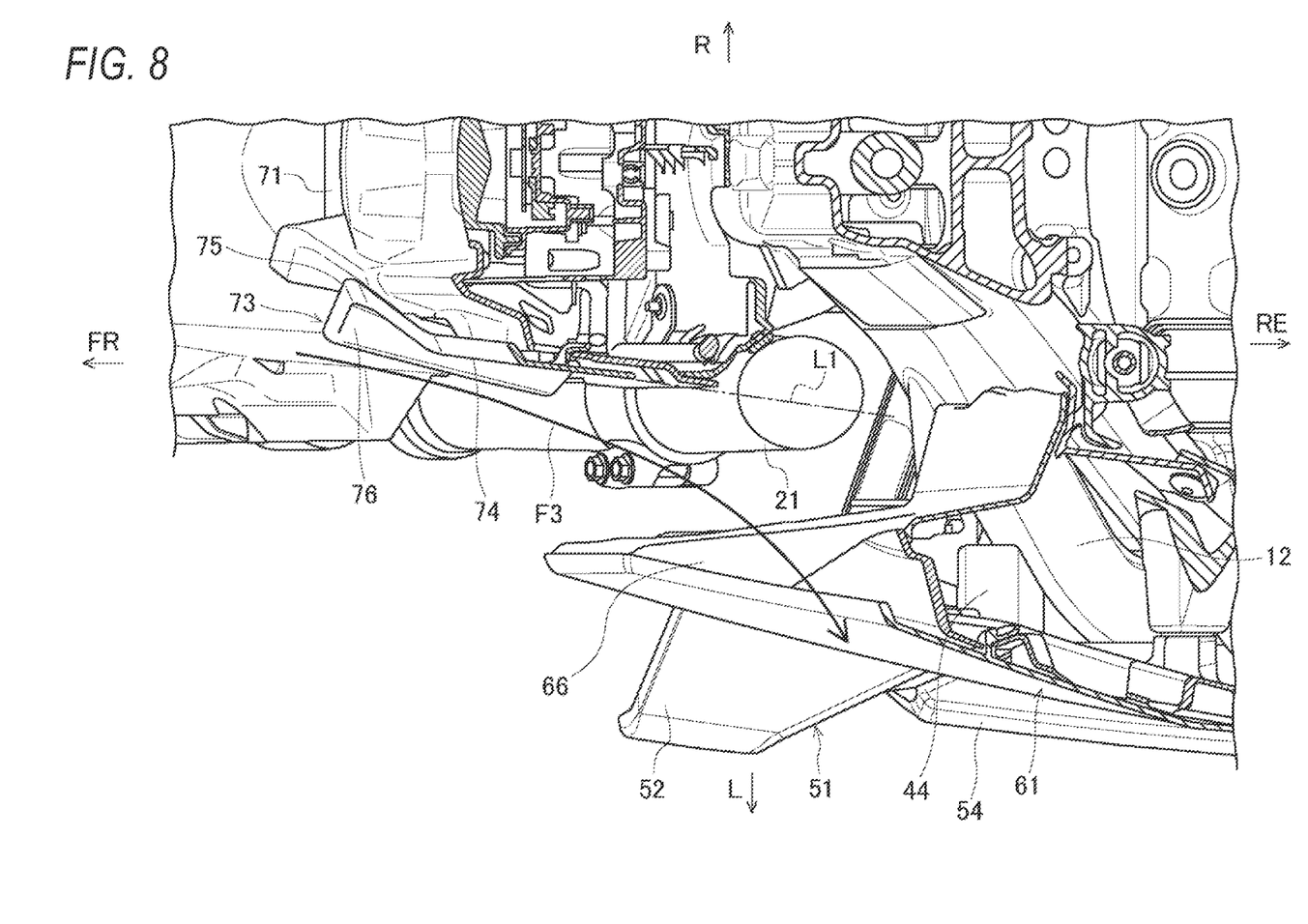
FIG. 8 is a cross-sectional view of the vehicle front portion taken along a line B-B of FIG. 7.

The flow of the running wind will be described with reference to FIGS. 7 and 8. FIG. 7 is an enlarged view of a left side of the vehicle front portion according to the present embodiment. FIG. 8 is a cross-sectional view of the vehicle front portion taken along a line B-B of FIG. 7.

As shown in FIG. 7, the outer lamp cover 73 is attached to the outer side surface of the base lamp cover 71, and the upper body cover 61 is attached to the outer side surface of the base body cover 31 on the rear side of the outer lamp cover 73. The lower end of the upper body cover 61 is positioned below the valley-shaped bent portion 75 on a lower side of the outer lamp cover 73, and the upper end of the upper body cover 61 is positioned above the mountain-shaped bent portion 77 on an upper side of the outer lamp cover 73. Thus, the upper body cover 61 is larger than the outer lamp cover 73 in the upper-lower direction on the rear side of the outer lamp cover 73.

The first guide surface 74 of the outer lamp cover 73 extends substantially horizontally, and the second guide surface 76 below the valley-shaped bent portion 75 extends obliquely upward from the front edge toward the rear edge. The front edge of the second guide surface 76 is positioned in front of the first guide surface 74 and inward in the left-right direction of the first guide surface 74 (see FIG. 4), and the running wind is likely to flow along the second guide surface 76. The running wind indicated by an arrow F1 is guided rearward by the first guide surface 74, and the running wind indicated by an arrow F2 is guided obliquely rearward by the second guide surface 76. The running wind indicated by the arrow F2 merges with the running wind indicated by the arrow F1 from below, so that the running wind is diffused in front of the upper body cover 61.

The third guide surface 78 below the mountain-shaped bent portion 77 is inclined outward in the left-right direction upward from the first guide surface 74. The running wind indicated by the arrow F1 is less likely to diffuse upward by the third guide surface 78, and the flow of the running wind from the outer side surface of the outer lamp cover 73 toward the occupant is prevented. Accordingly, the running wind is likely to flow from the first guide surface 74 of the outer lamp cover 73 toward the outer side surface of the upper body cover 61. The front fork 21 exists on a rear side of the first guide surface 74, and an outer peripheral surface of the front fork 21 also functions as a guide surface for guiding the running wind to the rear side.

As shown in FIG. 8, the front fork 21 is disposed inward in the left-right direction of the upper body cover 61 on the rear side of the outer lamp cover 73. An outer half portion (left half portion in the drawing) of the outer peripheral surface of the front fork 21 protrudes outward in the left-right direction relative to the outer lamp cover 73. An extension line L1 extending rearward from the first guide surface 74 passes a front end of the front fork 21 or passes a portion outward in the left-right direction than the front end of the front fork 21. Since the running wind from the first guide surface 74 contacts a portion outward in the left-right direction of the outer peripheral surface of the front fork 21, the running wind easily flows from the outer lamp cover 73 toward the outer side surface of the upper body cover 61 as indicated by an arrow F3.

Returning to FIG. 7, the inclined surface 62 inclined outward in the left-right direction from the front side toward the rear side and inclined inward in the left-right direction from the upper side toward the lower side is formed on the outer side surface of the upper body cover 61. A lower end of the inclined surface 62 of the upper body cover 61 has substantially the same height as a lower end of the second guide surface 76, and an upper end of the inclined surface 62 of the upper body cover 61 has substantially the same height as an upper end of the third guide surface 78. Since the inclined surface 62 of the upper body cover 61 is wide in the upper-lower direction, the running wind directed rearward from the outer side surface of the upper body cover 61 is easily received by the inclined surface 62 of the upper body cover 61.

Then, when the running wind is guided through the side of the front fork 21 to the inclined surface 62 of the upper body cover 61, the running wind is diffused outward in the left-right direction by the inclined surface 62 of the upper body cover 61. At this time, as indicated by an arrow F4, the running wind is less likely to diffuse upward due to an inclination of the inclined surface 62 of the upper body cover 61, and the flow of the running wind from the upper body cover 61 toward the occupant is prevented. Since the running wind is guided from the outer lamp cover 73 to the upper body cover 61, and the running wind is diffused outward in the left-right direction by the upper body cover 61, the contact of the running wind with the occupant is reduced even when the left-right width of the lamp cover 70 is narrow.

Thus, the running wind is diffused by merging the running wind indicated by the arrows F1 and F2 on the rear side of the outer lamp cover 73, and the running wind is further diffused outward in the left-right direction on the outer side surface of the upper body cover 61. Since the running wind is diffused in two stages, the contact of the running wind with the occupant is effectively reduced. On the outer lamp cover 73, the upward diffusion of the running wind is prevented by the third guide surface 78. On the upper body cover 61, upward diffusion of the running wind is prevented by the inclined surface 62. The running wind is less likely to flow from the outer lamp cover 73 and the upper body cover 61 toward an occupant side, and the contact of the running wind with the occupant is further reduced.

As described above, according to the present embodiment, the upper body cover 61 is disposed on the rear side of the outer lamp cover 73 and outward in the left-right direction of the outer lamp cover 73, and the outer side surface of the outer lamp cover 73 is inclined toward the outside surface of the upper body cover 61. The running wind from the front side is guided from the outer side surface of the outer lamp cover 73 to the outer side surface of the upper body cover 61, and the running wind is diffused outward in the left-right direction on the outer side surface of the upper body cover 61 in front of the occupant. Not only the outer side surface of the outer lamp cover 73, but also the outer side surface of the outer lamp cover 73 and the outer side surface of the upper body cover 61 direct the flow of the running wind outward in the left-right direction, so that it is not necessary to form a large left-right width of the lamp cover 70 for protection from wind. Therefore, it is possible to reduce the contact of the running wind with the occupant without impairing the appearance.

In the present embodiment, the body cover includes a plurality of cover members, but the body cover may include one cover member.

In the present embodiment, the lamp cover includes a plurality of cover members, but the lamp cover may include one cover member.

In the present embodiment, the first to third guide surfaces are formed on the outer side surface of the outer lamp cover, but the first to third guide surfaces may not be formed on the outer side surface of the outer lamp cover. The outer side surface of the outer lamp cover may be inclined outward in the left-right direction toward the outer side surface of the upper body cover.

In the present embodiment, the second guide surface is inclined outward in the left-right direction from the valley line toward the lower edge of the outer lamp cover in the front view, but the second guide surface may guide the running wind obliquely upward toward the rear side.

In the present embodiment, the third guide surface is inclined inward in the left-right direction from the ridge line toward the lower side of the outer lamp cover in the front view, but the third guide surface may guide the running wind rearward while preventing the upward diffusion of the running wind.

In the present embodiment, the outer lamp cover is formed in the substantially parallelogram shape in the side view, but an outer shape of the outer lamp cover is not particularly limited.

In the present embodiment, the inclined surface of the upper body cover is inclined outward in the left-right direction from the front side toward the rear side, and is inclined inward in the left-right direction from the upper side toward the lower side, but the inclined surface of the upper body cover may be at least inclined outward in the left-right direction from the front side toward the rear side.

The straddle-type vehicle is not limited to vehicles in general in which the occupant rides in a posture of straddling a seat, and also includes a small scooter-type vehicle in which the occupant rides without straddling a seat.

As described above, the cover structure of the present embodiment is the cover structure of the vehicle front portion of the straddle-type vehicle (1) provided with the headlamp unit (25), and includes the lamp cover (70) attached to the periphery of the headlamp unit; and the side cover (body cover 30) disposed on the rear side of the lamp cover and outward in the left-right direction of the lamp cover, in which the outer side surface of the lamp cover is inclined outward in the left-right direction toward the outer side surface of the side cover. According to this configuration, the side cover is disposed on the rear side of the lamp cover and outward in the left-right direction of the lamp cover, and the outer side surface of the lamp cover is inclined toward the outer side surface of the side cover. The running wind from the front side is guided from the outer side surface of the lamp cover to the outer side surface of the side cover, and the running wind is diffused outward in the left-right direction on the outer side surface of the side cover in front of the occupant. Not only the outer side surface of the lamp cover, but also the outer side surface of the lamp cover and the outer side surface of the side cover direct flow of the running wind outward in the left-right direction, so that it is not necessary to form a large left-right width of the lamp cover for protection from the wind. Therefore, it is possible to reduce the contact of the running wind with the occupant without impairing the appearance.

In the cover structure of the present embodiment, the first guide surface (74) that guides the running wind to the rear side is formed in the middle of the outer side surface of the lamp cover in the height direction, and the second guide surface (76) that guides the running wind obliquely upward toward the rear side is formed on the lower side of the outer side surface of the lamp cover. According to this configuration, the running wind flowing obliquely upward along the second guide surface merges with the running wind flowing rearward along the first guide surface, so that the running wind is diffused. When the running wind passes through the lamp cover, the running wind is further diffused by the side cover, and the contact of the running wind with the occupant is reduced.

In the cover structure of the present embodiment, the second guide surface extends from the front edge of the lamp cover to the rear edge of the lamp cover, and the front edge of the second guide surface is positioned in front of the first guide surface and inward in the left-right direction of the first guide surface. According to this configuration, the running wind easily flows along the second guide surface, and the running wind flowing along the first guide surface is effectively diffused by the running wind flowing along the second guide surface.

In the cover structure of the present embodiment, the front fork (21) is disposed inward in the left-right direction of the side cover on the rear side of the lamp cover, so that the extension line (L1) extending rearward from the first guide surface passes the front end of the front fork or passes a portion outward in the left-right direction than the front end of the front fork. According to this configuration, since the running wind from the first guide surface contacts the portion outward in the left-right direction of the outer peripheral surface of the front fork, the running wind easily flows from the lamp cover toward the outer side surface of the side cover.

In the cover structure of the present embodiment, the outer side surface of the side cover is provided with the inclined surface (62) inclined outward in the left-right direction from the front side toward the rear side and inclined inward in the left-right direction from the upper side toward the lower side. According to this configuration, the running wind is diffused outward in the left-right direction by the inclined surface of the side cover. At this time, the running wind is less likely to diffuse upward due to the inclination of the inclined surface of the upper body cover, and the flow of the running wind from the outer side surface of the upper body cover toward the occupant is prevented.

In the cover structure of the present embodiment, the third guide surface (78) that guides the running wind to the rear side while preventing the upward diffusion of the running wind is formed on the upper side of the outer side surface of the lamp cover. According to this configuration, the running wind is less likely to diffuse upward by the third guide surface, and the flow of the running wind from the outer side surface of the lamp cover toward the occupant is prevented. The running wind easily flows from the outer side surface of the lamp cover to the outer side surface of the side cover, and the outer side surface of the side cover diffuses the running wind outward in the left-right direction to reduce the contact of the running wind with the occupant.

Although the present embodiment has been described, the above-described embodiment and a modification may be combined in whole or in part as another embodiment.

The technique of the present disclosure is not limited to the above-described embodiment, and various changes, substitutions, and modifications may be made without departing from the spirit of the technical idea of the present disclosure. Further, the present invention may be implemented using other methods as long as the technical idea can be implemented by the methods through advance of the technology or other derivative technology. Accordingly, the claims cover all embodiments that may be included within the scope of the technical concepts.

What is claimed is:

1. A cover structure of a vehicle front portion of a straddle-type vehicle provided with a headlamp unit, the cover structure comprising:
    a lamp cover attached to a periphery of the headlamp unit; and
    a side cover disposed on a rear side of the lamp cover and outward in a left-right direction of the lamp cover, wherein
    an outer side surface of the lamp cover is inclined outward in the left-right direction toward an outer side surface of the side cover,
    a first guide surface that guides running wind to a rear side is formed in a middle of the outer side surface of the lamp cover in a height direction, and
    a second guide surface that guides the running wind obliquely upward toward the rear side is formed on a lower side of the outer side surface of the lamp cover,
    the outer side surface of the side cover is provided with an inclined surface inclined outward in the left-right direction from a front side toward the rear side and inclined inward in the left-right direction from an upper side toward a lower side,
    the first guide surface and the second guide surface are configured to merge the running wind flowing along the first guide surface with the running wind flowing along the second guide surface to guide a merged running wind from the first guide surface to the side cover.

2. The cover structure according to claim 1, wherein the second guide surface extends from a front edge of the lamp cover to a rear edge of the lamp cover, and a front edge of the second guide surface is positioned in front of the first guide surface and inward in the left-right direction of the first guide surface.

3. The cover structure according to claim 1, wherein
    a front fork is disposed inward in the left-right direction of the side cover on the rear side of the lamp cover, so that an extension line extending rearward from the first guide surface passes a front end of the front fork or passes a portion outward in the left-right direction than the front end of the front fork.

4. The cover structure according to claim 1, wherein a third guide surface that guides the running wind to the rear side while preventing upward diffusion of the running wind is formed on an upper side of the outer side surface of the lamp cover.

5. The cover structure according to claim 1, wherein
    the first guide surface extends in substantially horizontal, and the second guide surface obliquely extends from a front edge of the lamp cover toward a rear edge of the lamp cover.

6. The cover structure according to claim 1, wherein
a third guide surface that guides the running wind to the rear side while preventing upward diffusion of the running wind is formed on an upper side of the first guide surface,
the third guide surface is inclined outward in the left-right direction from the first guide surface toward the upper side, and
the second guide surface goes closer to a lower edge of the third guide surface from a front edge of the second guide surface toward the rear edge of the second guide surface.

* * * * *